United States Patent
Allen et al.

(10) Patent No.: US 6,536,081 B2
(45) Date of Patent: Mar. 25, 2003

(54) NOVELTY BALANCING APPARATUS

(76) Inventors: Otis P. Allen, Box 1745 Hwy. 97, Camilla, GA (US) 31730; Elby L. Williams, P.O. Box 105, Albany, GA (US) 31702

(*) Notice: Subject to any disclaimer, the term of this patent is extended or adjusted under 35 U.S.C. 154(b) by 0 days.

(21) Appl. No.: 09/901,832

(22) Filed: Jul. 9, 2001

(65) Prior Publication Data

US 2003/0005553 A1 Jan. 9, 2003

(51) Int. Cl.[7] .................. A44B 15/00; A44B 21/00; B25F 1/00
(52) U.S. Cl. .................. 24/3.6; 24/3.1; 24/163 K; 24/599.5; 224/163
(58) Field of Search .................. 24/3.6, 3.1, 599.5, 24/163 K; 70/457; 116/137 R; 224/163

(56) References Cited

U.S. PATENT DOCUMENTS

| | | | |
|---|---|---|---|
| 636,295 A | | 11/1899 | Sibthorpe |
| 778,776 A | * | 12/1904 | Eberle .................. 24/599.5 |
| 1,270,158 A | | 6/1918 | Hill |
| 1,676,648 A | * | 7/1928 | Hardiman .................. 224/163 |
| 2,284,197 A | * | 5/1942 | Greene .................. 24/599.5 |
| 2,320,067 A | | 5/1943 | Caughren |
| D152,727 S | * | 2/1949 | Peterson .................. D22/3 |
| 3,104,434 A | | 9/1963 | Noordhoek |
| 4,135,267 A | * | 1/1979 | McKinney, Sr. et al. . 24/163 K |
| D275,527 S | | 9/1984 | Gee |
| 4,512,579 A | * | 4/1985 | Clipper .................. 273/123 R |
| 4,709,651 A | | 12/1987 | Lance |
| 4,847,199 A | * | 7/1989 | Snyder et al. .................. 435/36 |
| 5,077,850 A | * | 1/1992 | Brubaker .................. 24/3.6 |
| 6,065,563 A | * | 5/2000 | Stowers .................. 24/3.6 |

* cited by examiner

Primary Examiner—Victor Sakran
(74) Attorney, Agent, or Firm—Brian D. Bellamy

(57) ABSTRACT

The present invention, also known as the equalizer, is a novelty device offering a challenging and entertaining environment when played. This particular novelty toy is designed and configured for use by a singular person. This novelty device comprises a substrate having a first end, a second end, an upper surface and a lower surface. The lower surface is flat and the upper surface includes a plateau area. From the plateau area the upper surfaces incline downward to the first end. The first end constitutes the holding area when utilizing the present invention. The object of the novelty device of the present invention is to balance an object, such as a belt, large paper clip, substantially flat pencils, or bookmarkers one the plateau area while holding the first end and maintaining the lower surface to be parallel to the ground.

10 Claims, 1 Drawing Sheet

NOVELTY BALANCING APPARATUS

BACKGROUND OF THE INVENTION

1. Field of the Invention

The present invention relates generally to an apparatus designed to entertain and more particularly to an apparatus that when utilized will challenge a user to balance an item, such as a belt or the like, so as to innately provide a device that is captivating and amusing. The invention further includes at least one or a combination thereof, of various features and elements, such as a key ring, hook and/or whistle that will enhance and add versatility to the final product.

2. Description of the Prior Art

Novelty toys, especially ones that have some interactive means, have always been popular. Interactions with these devices have proven to be successful by inherently providing an entertaining environment. Due to their success and the various interest and degrees of knowledge amongst individuals who participate, these novelty toys vary from being simple in concept, such as the typical pinwheel to complex and difficult to master, such as the well-known "Rubik's cube".

To increase the market potential of these novelty toys, these items will at times be miniaturized and combined with a mechanical utilitarian feature, such as a key ring, so as to provide for the device to be dual function. For example, it is not unusual to see a toy, such as the "Rubik's Cube" be miniaturized and combined with a key ring and sold as a "Rubik's Cube" key chain. Though still entertaining and including a functional feature, the miniaturization can make the particular device difficult to manipulate.

What is needed is a novelty toy that is unique and one that can produce hours of use and amusement. This will provide for a toy that is desirable to play continually and repetitively. The toy should be somewhat challenging, yet simple enough to be enjoyed and utilized by a wide variety of individuals, regardless of their age and mental magnitude. This device should be structured so as to be adapted to be combined with mechanical utilitarian features, without sacrificing on its functionality and entertaining aspect. Ultimately, providing a novelty toy that will invariably be enjoyed during each moment of use.

As will be seen, the present invention achieves its intended purposes, objectives and advantages by accomplishing the needs as identified above, through a new, useful and unobvious combination of component elements, to provide a toy that is simple to use, inexpensive to manufacture, and that will offer hours of enjoyment.

SUMMARY OF THE INVENTION

The present invention, also known as the equalizer, is a novelty device offering a challenging and entertaining environment when played. This particular novelty toy is designed and configured for use by a singular person. The object of the novelty device of the present invention is to balance an object, such as a belt, large paper clip, substantially flat pencils, bookmarkers, or the like.

Enabling such a configuration, the present invention comprises a substrate having opposite ends, a top surface and a lower surface. The lower surface is flat and planar while the top surface curves upward from a first end and plateaus in a substantially center area. The second end can be flat or can curved downward. This provides for the curved down portion, either the first end or second end, to be the area for holding the device of the present invention and the plateau area will receive the object to be balanced. Thus in use the user grasps the end that is curved downward, either the first or second end. While maintaining the particular end, an object is placed on the plateau area. Moving and tilting the invention left, right, downward and/or upward, yet horizontal, the user tries to balance the object held thereon. Thus providing a challenging, yet fun activity.

The present invention is preferably fabricated from a polymeric material. This material can be coated with a fluorescent substance so as to provide for a more aesthetically pleasing product. Optionally, the polymeric material can be mixed with a phosphorescent substance so as to provide for a product that exhibits illumination capability with the absence of light.

For enhancing the present invention, one end can include an aperture extending horizontally therethrough. This will enable for a conventional key ring or the like to be inserted therein and enabling the present invention to operate and function as a key chain. In an alternative configuration, an end of the substrate can include a hook member. This will enable the present invention to be removably attachable to an article such as a belt, pants, notebook or the like, and thus enable a storage means.

The equalizer can include a whistle located therein. In this design, the substrate of the present invention can be partially hollow and include an end that is open. The top surface will include an aperture that extends to the hollow portion of the substrate. A ball, reed or the like can be located within the hollow portion. Thus, in use, an individual would blow into the open end to allow for air to pass through the hollow area. As the air passes over the particular object, ball, reed or the like, and exits the aperture, sound is generated. Thereby allowing for the equalizer to act as a combined toy and whistle.

Thus, it is seen that the present invention can include at least one utilitarian feature, such as the aperture, hook or whistle. Alternatively, the present invention can be provided with one utilitarian feature that is combined with at least one additional utilitarian feature or alternatively two utilitarian features, so as to ultimately provide for a versatile and useful device.

Accordingly, it is an object of the present invention to provide a novelty device that is fun, yet challenging to the user.

Another object of the present invention is to provide for a novelty device that is entertaining and also includes at least one mechanical utilitarian feature attached thereto.

Yet a further object of the present invention, to be specifically enumerated herein, is to provide a novelty device in accordance with proceeding objects and which will conform to conventional forms of manufacture, be of simple construction and easy to use so as to provide a novelty device that would be economically feasible, long lasting and relatively trouble free during utilization.

The present invention meets the requirements of the simplified design, compact size, low initial cost, low operating cost, ease of maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or by modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
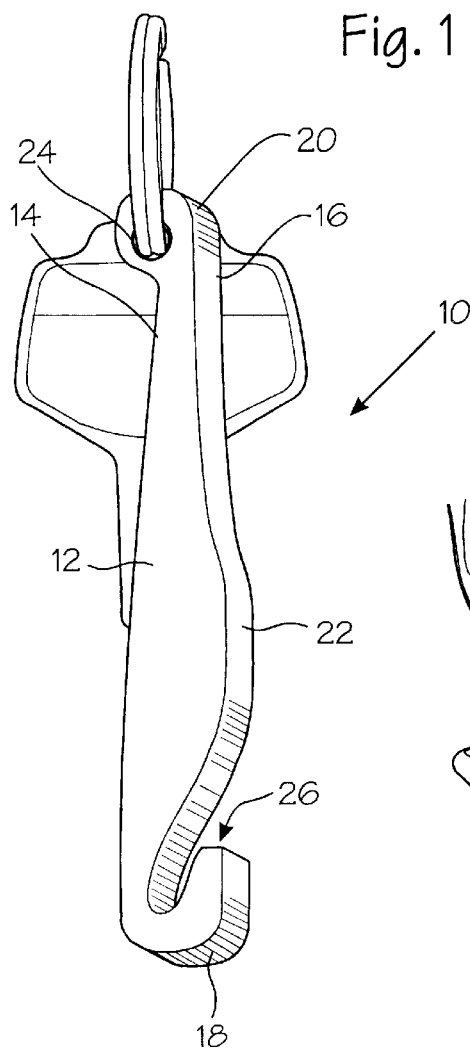
FIG. 1 is a perspective view of the novelty device of the present invention.
Figure 2:
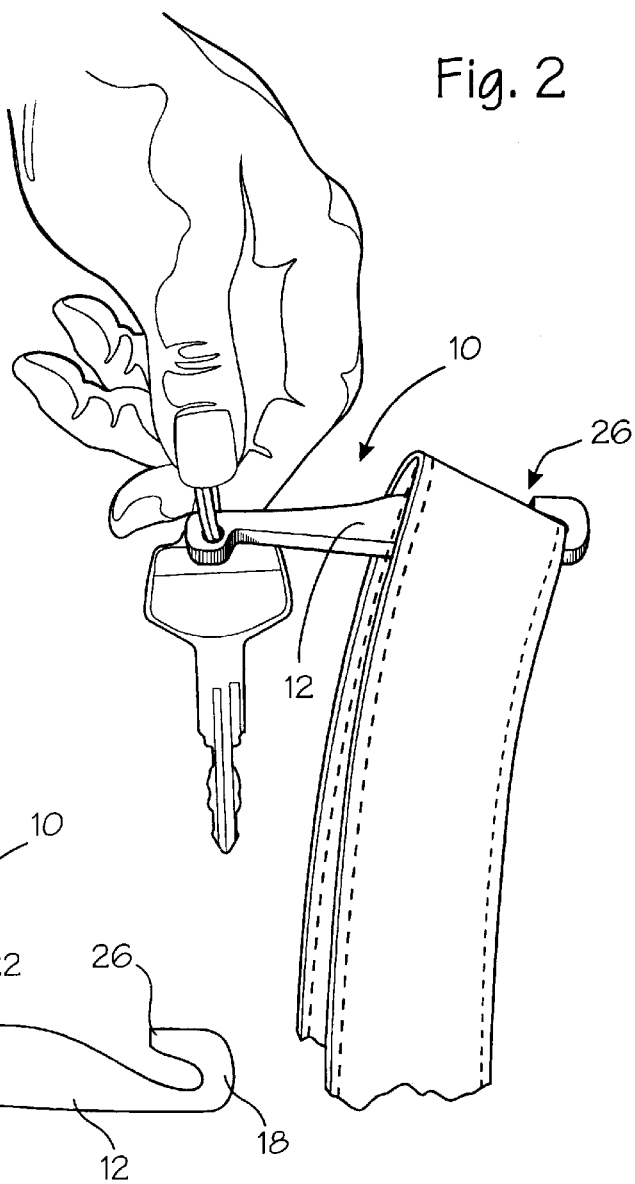
FIG. 2 is a perspective view of the novelty device of the present invention in use for entertainment in balancing a belt-like object.
Figure 3:
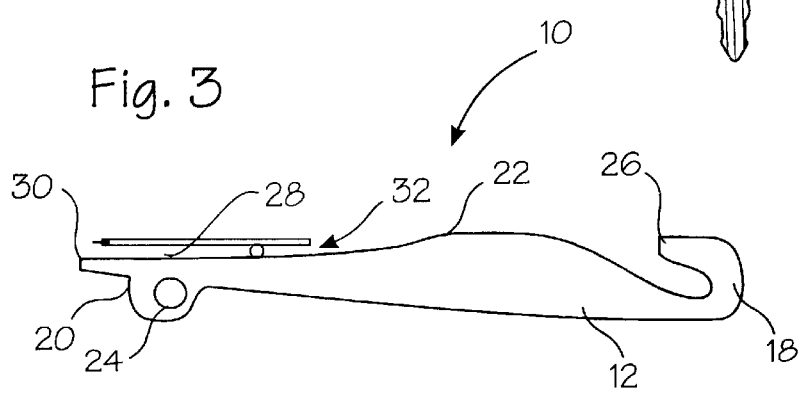
FIG. 3 is a side cross-sectional view of the novelty device of the present invention.

With reference to the drawings, in particular to FIGS. 1–3 thereof, the present invention, a novelty device, known as the equalizer and denoted by reference numeral 10 will be described. This novelty device is for entertaining purposes and the object is to balance an object thereon such that the device rests in a horizontal position. Shown is a novelty device 10 comprising a substrate 12 having a lower surface 14, an upper surface 16, a first end 18 and a second end 20.

The upper surface 14 of the substrate 12 is substantially flat and planar. This flat and planar wall will be located parallel to the ground when the device is in use. The upper surface 16 will receive the object, such as a belt, large paper clip, substantially flat pencil or the like. As such, located on the upper surface 16 is a flat plateau area 22. This area 22 will receive the particular object.

From the plateau area 22, the upper surface extends downwardly. This downward slope, illustrated as extending downward from the plateau area to the second end 20, is the area that receives the user's fingers. Thus, the user will make a partial fist and place their thumb on the upper surface of the second end, and their forefinger will be located on the lower surface of the substrate. Once held, the device is ready to be utilized. In use, the lower surface 18 must remain parallel to the ground. An object is placed on the plateau area. While moving the invention left or right, yet horizontal, the user tries to balance the object held thereon. Thus providing a challenging, yet fun environment.

To provide for a comfortable fit, the plateau area starts centrally on the substrate. This provides for approximately half of the substrate to receive the user's hand. Thus rendering adequate fit regardless of user's age and size. It is noted that this plateau area can be either flat, as illustrated, or optionally can further include a slight incline, no more that five degrees. The slight incline will assist in maintaining the object on the plateau area.

For increasing the difficulty level, the upper surface can extend downwardly from the plateau area to the first end. This will provide for each side of the substrate to slope down. Inherently reducing the size of the plateau area while increasing the challenge.

The present invention is preferably fabricated from a polymeric material. This material can be coated with a fluorescent substance so as to provide for a more aesthetically pleasing product. Optionally, the polymeric material can be mixed with a phosphorescent material so as to provide for a product that exists illumination capability with the absence of light. Providing a device that is coated with a fluorescent material or includes a phosphorescent material innately provides a device that is clearly visible to the user and thus reduces the chance and possibility of losing the present invention.

Adding to the versatility of the present invention, an end can include an aperture 24 extending horizontally therethrough. As seen in the figures, the second end includes the aperture 24. This will enable for a conventional key ring or the like to be inserted therein and enabling the present invention to operate and function as a key chain. Alternatively, and as illustrated, a flange member can extend downwardly from an end of the lower surface. This flange can include the aperture 24. This flange member provides a comfortable resting area for the forefinger when the device is used as a novelty toy.

Located at the opposite side of the holding end can be an inwardly located hook 26. This hook is an attaching device and allows for the substrate to be attached to a desired surface, such as pants, belts, notebook or the like. Thereby, the hook provides a storage means.

The equalizer can further include a whistle located therein. In this design, the substrate of the present invention can have a hollow channel 28 extending partially therein, as illustrated in FIG. 3. This inherently provides for an end that is open. Optionally, and as illustrated, extenders 30 can extend outwardly from the open end to provide an area to comfortable receive the mouth of the user. Extending from the top surface to the channel 28 is an aperture 32. A ball, reed or the like can be located within the hollow portion. Thus, in use, an individual would blow into the open end to allow for air to pass through the hollow area. As the air pass over the ball or reed and exits the aperture, sound is generated. Thereby allowing for the equalizer to act as a combined toy and whistle.

Thus, it is seen that the present invention can include at least one utilitarian feature, such as the aperture, hook or whistle. Alternatively, the present invention can be provided with one utilitarian feature that is combined with at least one and/or both additional utilitarian features, so as to ultimately provide for a versatile and useful device.

Preferably, the present invention be compact in size, so that it can adequately be used as to balance an item and still be of a size that would enable it to function successfully as a key ring, hook, whistle or the like. Thus the length, from the first end to the second end, would be approximately 2.5 inches to 4.5 inches, preferably three inches. The height would range from approximately 0.5 inches to two inches, preferably 0.5 inches. The width would range from approximately 0.5 to four inches, preferably 0.5 inches.

While the present invention has been particularly shown and described with reference to an embodiment thereof, it will be understood by those skilled in the art that various changes in form and detail may be made without departing from the spirit and scope of the present invention.

We claim:

1. A novelty device comprising:

a substrate having a first end, a second end, an upper surface and a lower surface;

said lower surface is flat and planar and free from obstructions;

a plateau area is located on said upper surface;

said upper surface declines downward from said plateau area to said first end;

a channel extends partially through said substrate, an aperture extends vertically from said upper surface to said channel, an object is located in said channel and is free to move within said channel or said channel includes a reed, said first end includes an opening to provide access to said channel, and said channel, said aperture, said object or reed, and said opening form a whistle; and wherein said first end constitutes a holding area and said plateau area is adapted to removably receive an object for challenging a user to attempt to balance said object.

2. A novelty device as in claim 1 wherein said first end includes an inward hook that extends upwardly.

3. A novelty device as in claim 2 wherein a second aperture extends horizontally through said second end and is non-obtrusive to said opening.

4. A novelty device as in claim 3 wherein said substrate is fabricated from a polymeric material.

5. A novelty device as in claim 4 wherein said substrate is coated with a fluorescence substance.

6. A novelty device as in claim 4 wherein said polymeric material is mixed with a phosphorescent material to provide for said substrate to glow in the absence of light.

7. A novelty device as in claim 1 wherein a second aperture extends horizontally through said second end and is non-obtrusive to said opening.

8. A novelty device as in claim 1 wherein said substrate is fabricated from a polymeric material.

9. A novelty device as in claim 8 wherein said substrate is coated with a fluorescence substance.

10. A novelty device as in claim 8 wherein said polymeric material is mixed with a phosphorescent material to provide for said substrate to glow in the absence of light.

* * * * *